(12) United States Patent
Irvin et al.

(10) Patent No.: US 8,722,130 B2
(45) Date of Patent: May 13, 2014

(54) HEATED BUTTERMILK AND CREAM FOR MANUFACTURING CREAM CHEESE PRODUCT

(75) Inventors: Scot Alan Irvin, Vernon Hills, IL (US); Chad David Galer, Glenview, IL (US); Omar Atia, Morton Grove, IL (US)

(73) Assignee: Kraft Foods Group Brands LLC, Northfield, IL (US)

( * ) Notice: Subject to any disclaimer, the term of this patent is extended or adjusted under 35 U.S.C. 154(b) by 1300 days.

(21) Appl. No.: 11/757,123

(22) Filed: Jun. 1, 2007

(65) Prior Publication Data

US 2008/0299278 A1 Dec. 4, 2008

(51) Int. Cl.
*A23C 19/00* (2006.01)
(52) U.S. Cl.
USPC ............. 426/582; 426/38; 426/573; 426/580
(58) Field of Classification Search
USPC ........................................................ 426/582
See application file for complete search history.

(56) References Cited

U.S. PATENT DOCUMENTS

| 4,001,437 A * | 1/1977 | Jaeggi et al. ............ 426/34 |
| 2003/0031771 A1* | 2/2003 | Woelfel et al. ............ 426/534 |
| 2004/0151801 A1* | 8/2004 | Sorensen et al. ............ 426/38 |
| 2005/0214430 A1* | 9/2005 | Laye et al. ............ 426/582 |

FOREIGN PATENT DOCUMENTS

| EP | 0233378 B1 | 5/1989 |
| EP | 0244009 B2 | 4/1999 |

OTHER PUBLICATIONS

Patton et al. "Carbon-14 Activity of Some Heat-Degradation Products of Milk Containing Lactose-1-C14", Science, vol. 125 (31) May 195, pp. 1087-1088.*

* cited by examiner

*Primary Examiner* — Elizabeth Gwartney
(74) *Attorney, Agent, or Firm* — Fitch, Even, Tabin & Flannery LLP

(57) ABSTRACT

The present disclosure relates generally to the heating of buttermilk and cream for extended periods of time to provide a novel flavorant. The flavorant may be used to provide low-fat dairy products, such as low-fat cream cheese, with organoleptic properties similar to full-fat cream cheeses. The flavorant may also be incorporated into other food products to provide creamy and buttery flavors where desirable.

7 Claims, 4 Drawing Sheets

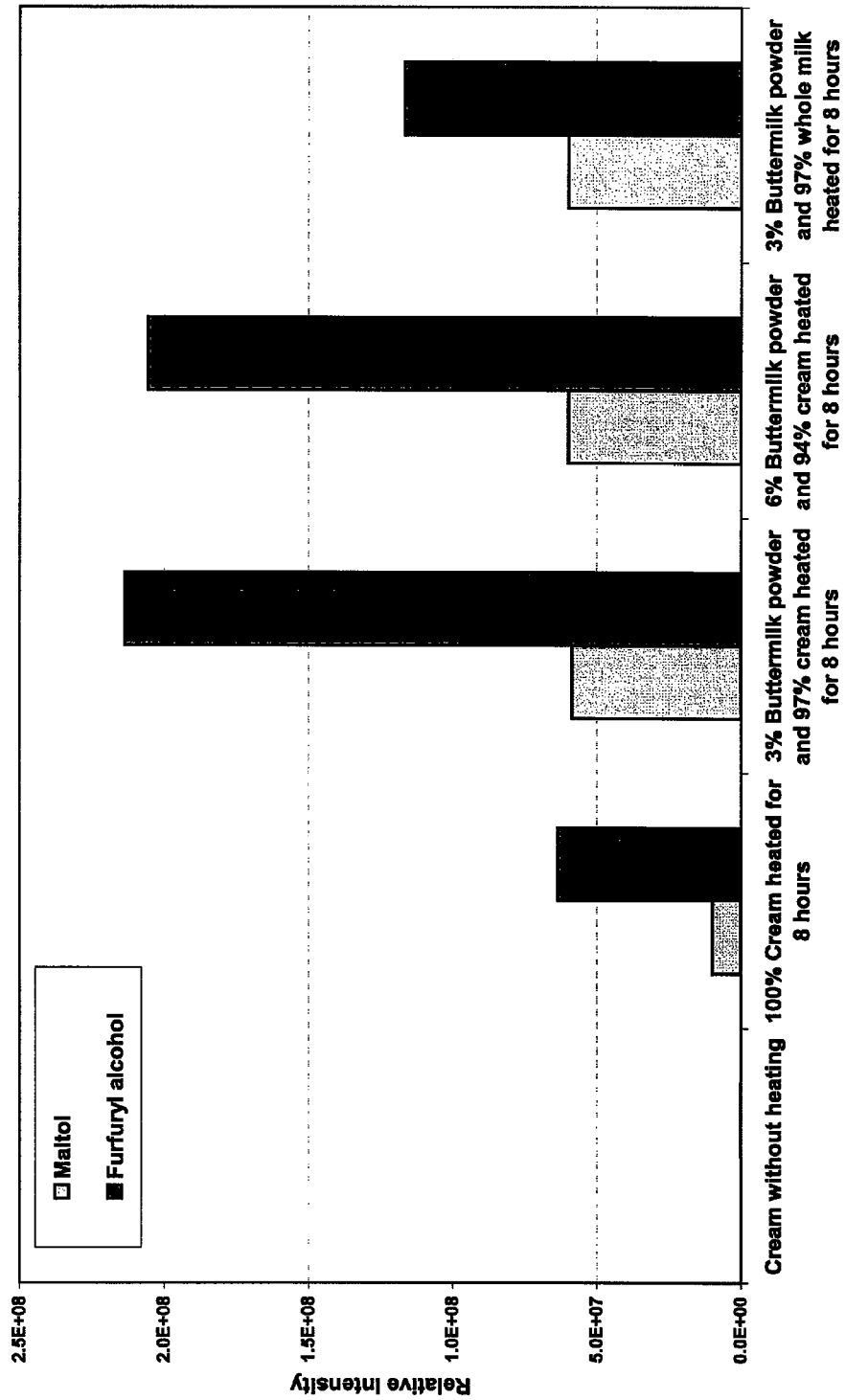

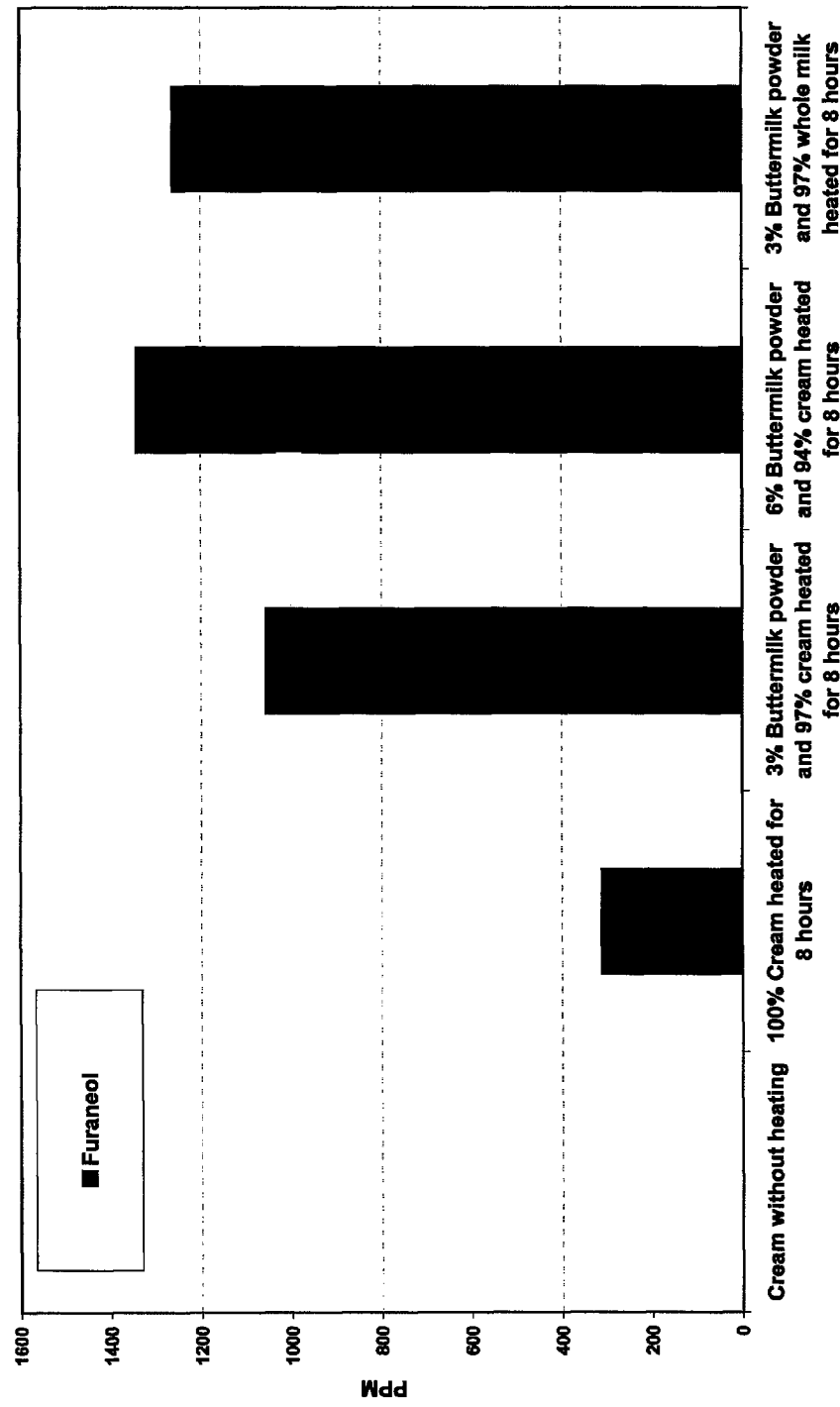

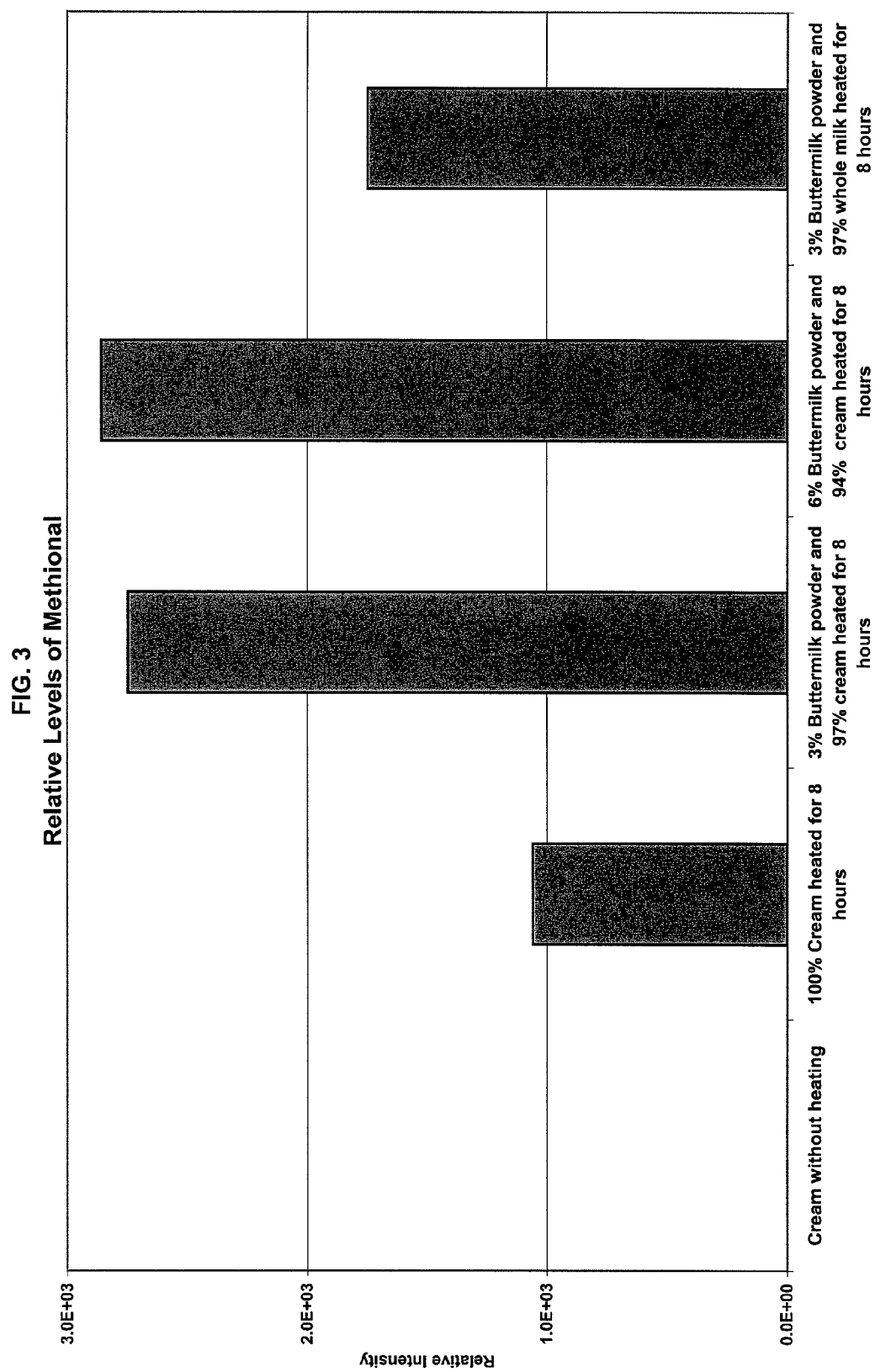

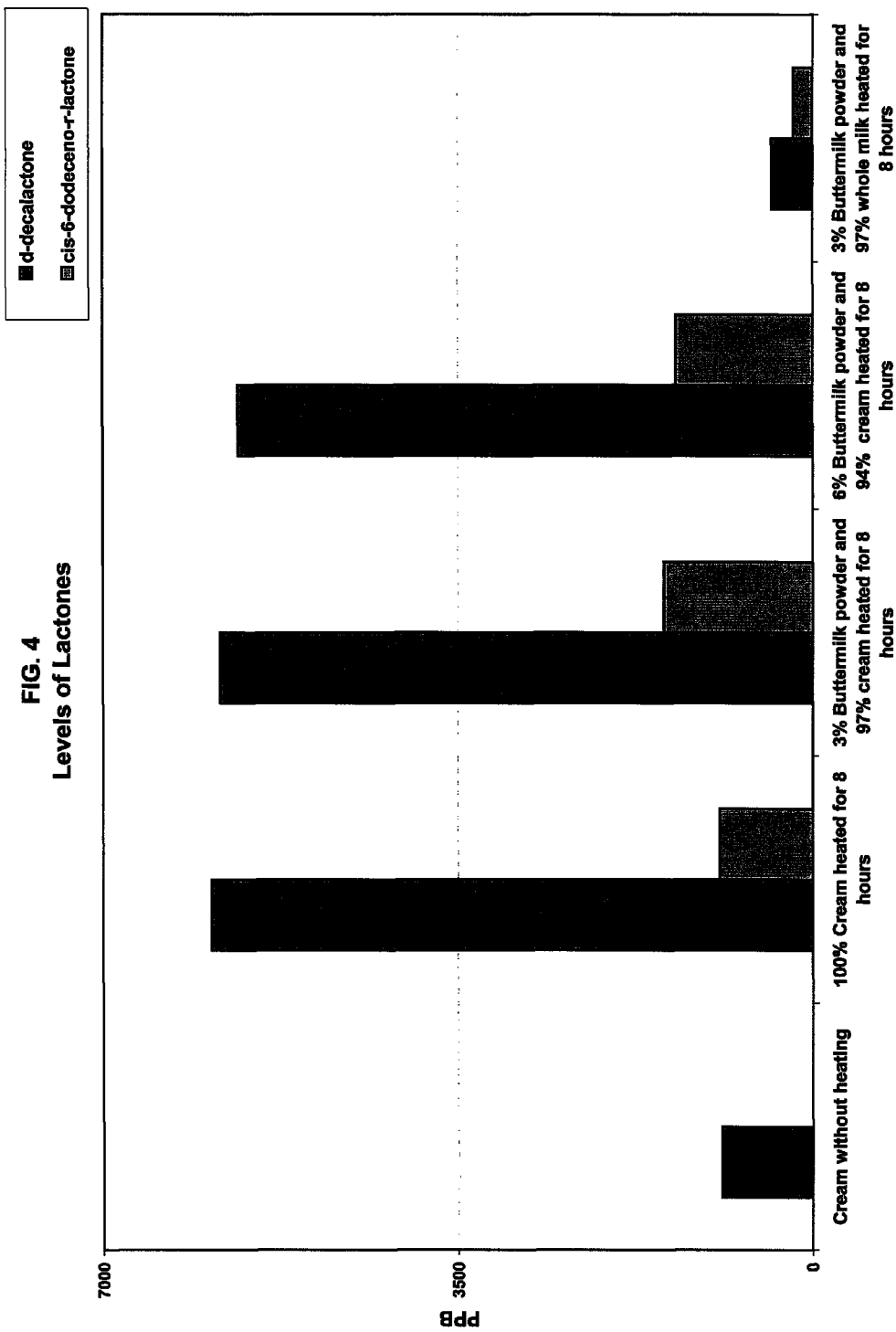

HEATED BUTTERMILK AND CREAM FOR MANUFACTURING CREAM CHEESE PRODUCT

FIELD OF THE INVENTION

The present disclosure relates generally to flavorants created by heating a combination of buttermilk and cream. The disclosure further relates to lower fat dairy products, such as low fat cream cheeses and low fat cottage cheese, manufactured with the use of heated buttermilk and cream to produce a low-fat dairy product with organoleptic properties similar to full-fat dairy products.

BACKGROUND

Low fat alternatives to many food products have been developed in order to satisfy the needs of health-conscious consumers. In particular, a variety of low fat dairy products have been created, for instance, by substituting some or all of the cream ordinarily incorporated into the food product with low fat milk. Unfortunately, the lowered fat content of these products often results in a loss of desirable flavor characteristics.

For example, low-fat cream cheese products have been developed as alternatives to full-fat cream cheeses. Cream cheese is a particularly soft, mild, acid-coagulated uncured cheese made from a mixture of cream and milk. Cream cheese has a smooth and butter-like body and is stored under refrigeration conditions. Cream cheese can be sliced and spread at refrigeration temperatures. In traditional manufacturing of cream cheese, uncultured whole milk and/or skim milk and sweet cream are blended in pre-selected proportions to form a cream cheese mix. The cream cheese mix normally has a butterfat content of from about 10 to about 20 percent. After processing, the finished cream cheese has a butterfat content of from about 30 to about 35 percent by weight. The cream cheese mix is pasteurized and homogenized, after which it is cooled, usually to a temperature between 62 and 92° F., and is then inoculated with a lactic acid culture. The mix is held at the inoculation temperature until it has ripened and formed a coagulum. The coagulation process may, optionally, be aided by the addition of a small amount of rennet. The acidity of the coagulum is from about 0.6 to about 0.9 percent (calculated as percent equivalent lactic acid). After the desired acidity is obtained, the curd is separated from the whey and packaged. This process is often referred to as a "separator method," since the curd and whey are separated in order to isolate the curd.

So-called "wheyless" processes for making cream cheese also have been developed. In these processes, whey proteins, which are discarded in traditional cheese making processes, are incorporated into the cheese so that the separation of curd and whey is avoided. The making of wheyless cream cheese products may comprise heating a milk system, adding a protein stabilized emulsion system, homogenizing the mixture, heating the homogenized mixture, adjusting the pH with food grade acidulants to a desired acidity, adding flavorants and other ingredients/stabilizers, and, if necessary, adjusting moisture content of the product by adding or removing water, and homogenizing the mixture to produce a cream cheese. The protein stabilized emulsion system may contain milk proteins, whey proteins, butter fat or other food grade fat (e.g., cream, concentrated milk fat ("CMF"), anhydrous milkfat, or a combination thereof), water, and other proteins or ingredients. Wheyless processes have cost advantages over traditional separator methods of cream cheese production because whey proteins are relatively low in cost compared to casein and caseinates that make up traditional cream cheese. In addition, incorporating whey proteins into cream cheeses preserves many nutrients that are lost when the whey is discarded in traditional processes. Whey proteins are also understood to have superior emulsifying capabilities in comparison with casein, the primary protein component of most traditional cheese.

Since cream cheeses usually contain relatively high levels of fat (about 30 to about 35 percent), it is desirable to provide a low-fat or reduced-fat cream cheese as a substitute to full-fat cream cheese. However, most prior art low-fat cream cheeses are higher in sour notes and lack the creamy, buttery flavors associated with full-fat cream cheeses. Therefore, it is desirable to provide a low-fat or reduced-fat cream cheese that contains organoleptic properties identical or substantially similar to those of full-fat cream cheeses. It is further desirable to provide methods of making such low-fat or reduced-fat cream cheese.

Likewise, it is also desirable to provide low fat alternatives to a variety of other dairy products, and to provide methods of adding desirable creamy, buttery flavors to a variety of other food products without significantly increasing the fat content of those food products.

SUMMARY

The present invention involves using heated buttermilk and cream to create a flavorant for use in food products. In one aspect, the flavorant is used to produce a cream cheese that is lower in fat than normal full fat cream cheese, but has substantially the same organoleptic properties, including a creamy texture and creamy, butter-like flavors rather than the sour notes associated with most reduced-fat cream cheeses. The terms "normal" and/or "full fat" as used herein in reference to cream cheese refer to about 30% fat. The term "low fat" refers to a fat content of about 20% to less than about 30% fat. As used herein, "buttermilk" refers to sweet cream buttermilk (a byproduct of churning butter or concentrated milk fat) in the form of a single strength liquid, a condensed liquid, or dry powder.

In one aspect of the invention, buttermilk and cream are blended and heated for at least about 4 to about 48 hours at about 150° F. to about 250° F., preferably for about 8 to about 12 hours at about 185° F. to about 195° F., to form a heated cream mixture that is rich in creamy, buttery flavors. Milk may also be substituted for a portion or all of the cream mixed with the buttermilk in order to provide especially low fat products. However, replacing cream with milk tends to reduce the flavor intensity of the flavorant as compared to the buttermilk and cream combination, although a flavorant consisting solely of buttermilk and whole milk heated for the specified time at the specified temperatures still provides some flavor benefit.

The concentrated flavorants provided herein are well suited for use in reduced fat cream cheeses, and provides such reduced fat products with flavors similar or comparable to products having normal fat content. The flavorant is incorporated into the cream cheese making process as a substitute for a portion of the cream or milk normally used therein. The heated buttermilk and cream should comprise about 0.5 percent to about 70 percent of the total cream cheese by weight, preferably about 10 to about 12 percent.

Without wishing to be bound to a particular theory, it is believed that the heating of buttermilk, cream, and milk increases the concentration of compounds such as furfuryl alcohol, maltol, furaneol, methanol, certain key lactones (such as γ-dodecalactone, δ-decalactone, δ-dodecalactone, δ-tetracalactone, γ-octalactone, cis-6-dodecene-γ-lactone, δ-octalactone, δ-hexalactone, furaneol, and the like), and phospholipids (from the churning process), which leads to creamier texture and less sour flavors in the finished cream cheese. The heated flavorant has more sweet cream flavors than unheated buttermilk, cream, and/or milk. Flavorants comprising a combination of buttermilk and cream heated for about 4 to about 48 hours at about 150° F. to about 250° F. have superior flavor characteristics to compounds heated for extended periods of time but lacking either buttermilk or cream. When incorporated into a cream cheese mixture, the flavorants produce a finished cream cheese with sweeter, creamier flavors.

The concentrated flavorant provided herein is not limited to cream cheese applications, and may also be used to impart flavors to a variety of dairy, and even non-dairy, food products.

BRIEF DESCRIPTION OF FIGURES

FIG. 1 shows relative maltol and furfuryl alcohol levels in different compositions containing cream and/or buttermilk.

FIG. 2 shows furaneol levels in different compositions containing cream and/or buttermilk.

FIG. 3 shows relative methanol levels in different compositions containing cream and/or buttermilk.

FIG. 4 shows lactone levels in different compositions containing cream and/or buttermilk.

DETAILED DESCRIPTION

Provided herein are flavorants and uses for flavorants created by heating buttermilk and cream together for extended periods of time. Heating cream, buttermilk, a mixture of buttermilk and cream, or a mixture of buttermilk and milk for extended periods of time (generally at least about 4 to about 48 hours, preferably about 8 to about 12 hours) at a temperature of about 150° F. to about 250° F., preferably about 185° F. to about 195° F., increases the intensity of certain flavor compounds, allowing the buttermilk/cream mixture to be used as a flavorant that is especially useful in making low fat foods which have taste comparable to full fat foods. Preferably, steps are taken to minimize losses due to evaporation, although some moisture loss is acceptable as long as burning of the buttermilk and cream does not take place. For instance, heating of the buttermilk and cream may take place in a closed vessel, or may employ techniques or systems for controlling moisture levels, such as reflux condensers, vacuums, or any other devices for retaining moisture and/or minimizing loss of water at high temperatures. As used herein, "burning" refers to significant degradation of functional and/or flavor characteristics resulting in undesirable burned flavors or high viscosities that prevent a mixture from being blended into food products. In addition, slow and constant agitation may be applied to the mixture (e.g., at approximately 0-20 RPM) in order to avoid burning of product. The moisture content of the buttermilk, however, is sufficiently high so that heating at the prescribed temperatures for the prescribed amount of time in a closed vessel ordinarily will not result in burning or otherwise adversely affecting the flavor of the buttermilk and cream mixture.

The heating of buttermilk and cream for an extended period of time develops concentrated sweet flavors in those components. Upon mixing with other food product ingredients, those concentrated flavors are extended throughout the food product. This allows for gains in processing efficiency, since only a portion of the food product need be treated by heating for extended periods of time in order to provide desired flavor characteristics.

In one aspect of the invention, cream and buttermilk are blended together and heated for an extended period of time to create a flavorant that may be used in preparing food products, including cream cheese and cream cheese-like products. A reduced-fat cream cheese (i.e., less than 30% fat, preferably about 25-26% fat) is provided with organoleptic properties similar to those of normal-fat cream cheeses by utilizing the heated cream and buttermilk flavorant provided herein. The buttermilk/cream flavorant is preferably about 1% to about 10% buttermilk. For separator process cream cheese products, the flavorant is more preferably about 2% to about 4% buttermilk, and for wheyless cream cheese products the flavorant is more preferably 7% to about 8% buttermilk. The cream preferably has a fat content of about 35 to about 45 percent. The buttermilk is preferably buttermilk made from churning butter or concentrated milk fat (CMF), and may be used as a single strength liquid, condensed liquid, or dry-powdered form. The buttermilk also preferably has a fat content of about 0.25 to about 1.5 percent. Milk may be substituted for some or all of the cream in order to create a lower fat flavorant. Preferably no more than 75%, more preferably no more than 50%, and even more preferably no more than 25% of the cream in the flavorant is replaced with milk.

The heating times and temperatures for the buttermilk and cream should be selected in order to be effective for increasing the concentration of lactones (e.g., γ-dodecalactone, δ-decalactone, δ-dodecalactone, δ-tetracalactone, γ-octalactone, cis-6-dodeceno-γ-lactone, δ-octalactone, δ-hexalactone, furaneol, and the like), phospholipids (from the churning process), and other flavor compounds. The increased concentrations of these compounds are believed to produce a cream cheese with superior flavor. Although heating of cream alone for extended periods has been found to produce some desirable flavors, it has been advantageously discovered that mixtures of cream and buttermilk develop an especially desirable creamy flavor and texture upon heating for at least 4 hours at a temperature of 150° F. to about 250° F.

The buttermilk for use in the present invention may be made by churning butter or CMF and collecting the resultant liquid. The buttermilk may be used as a single strength liquid, or may be further condensed or dried (for instance to form powdered buttermilk by removing moisture from sweet cream buttermilk). A variety of suitable commercially-available buttermilks may also be used. Suitable liquid and powder buttermilk may be obtained from a number of sources, including Land O' Lakes (St. Paul, Minn.), O-At-Ka (Batavia, N.Y.), Kraft (Visalia, Calif.), Dairy America (Fresno, Calif.), and Agri-Mark (Lawrence, Mass.).

In another aspect of the present invention, a cream cheese spread having from about 22% to about 35% total fat is produced by heating buttermilk and cream (or another fat source, such as CMF, anhydrous milkfat, and the like, or a combination thereof) for at least about 4 hours to about 48 hours at about 150° F. to about 250° F. to create a first mixture; combining the first mixture with fresh cream (or another fat source, such as CMF, anhydrous milkfat, and the like, or a combination thereof) and milk to form a second mixture; inoculating the second mixture with a culture to form a coagulum comprising curds and whey; removing the whey from the coagulum to form curds; and mixing the curds to form a cream cheese spread. A pH adjustment step may also be included so that the finished cream cheese product has a pH of about 4 to about 5.5. In such a separator process cream cheese product, fresh cream and other ingredients should be added in an amount so that the buttermilk/cream flavorant represents approximately 0.5% to about 70%, preferably about 6-8% of the total finished product In another aspect of the invention, wheyless cream cheese is manufactured by holding cream (or a substitute fat source) and buttermilk for an extended time (at least about 4 hours to about 48 hours) at an elevated temperature of about 150° F. to about 250° F. to form a buttermilk-based flavorant. The buttermilk flavorant may be stored (preferably at about 35-45° F.) for later use or used immediately. This buttermilk flavorant is then combined with a source of whey protein (such as whey protein concentrate, whey powder, sweet whey, acid whey, or the like, or combinations thereof) and mixed thoroughly. Salts, gums, preservatives, and the like may optionally be added in order to enhance the flavor, texture, and/or microbial stability of the finished product. Fresh cream is then added to the flavorant and heated at a temperature of about 75° F. to about 210° F. for about 5 to about 15 minutes. In a wheyless cream cheese product formulation, fresh cream and other ingredients should be added in an amount so that the buttermilk/cream flavorant represents approximately 0.5% to about 70%, preferably about 10% to about 12%, of the total product. After the addition of fresh cream, the mixture is then homogenized under pressure (preferably about 1,000 psi to about 10,000 psi), followed by pasteurization. The pH of the mixture may be adjusted before or after homogenization, if necessary, to a level of about 4.4 to about 4.8 to form a finished cream cheese. Finished low-fat cream cheeses made by the separator process disclosed herein have a total fat content of about 20 to less than about 30 percent by weight, preferably about 25 to about 26 percent, but have similar flavor characteristics to a "normal" cream cheese with about 30 percent total fat.

Sources of whey protein for use in these cream cheese products include whey protein concentrates (such as WPC34, WPC53, or WPC80 obtained from mozzarella whey), sweet whey, Krafen™ (Kraft Foods, Glenview Ill.), acid whey produced in cream cheese operations, and the like, as well as mixtures thereof.

Preferably, finished cream cheese made as disclosed comprises about 0.05 to about 2.0 percent buttermilk. More preferably the finished product is about 0.2 to about 0.8 percent buttermilk for wheyless cream cheese products, and about 0.05 to about 0.40 percent for cream cheese products manufactured by a separator process. The finished cream cheese preferably should not contain more than about 5.0 percent buttermilk, since higher levels of buttermilk may create bitter or sour diacetyl flavors that are noticeably different than those of normal cream cheese and are not generally acceptable to consumers. Increasing levels of buttermilk also impart increasing mushroom-like or "earthy" flavors to the finished cream cheese that, while not generally unpleasant, will tend to be noticeably different than normal cream cheese when the buttermilk comprises more than about 4-6 percent of the finished cream cheese on a solid basis.

In another aspect, the flavorant may be used to manufacture a lower fat cottage cheese. Traditional cottage cheese is comprised of a cheese curd in a liquid dressing. Cottage cheese products typically comprise about 50% to about 70% curd by weight. The heated buttermilk and cream flavorant provided herein may be added to the dressing in order to improve flavor. Adding from about 0.5% to about 5%, preferably about 2%, buttermilk and cream flavorant by weight to the dressing has been found to improve the overall perception of richness in the cottage cheese. In particular, increased perceptions of dairy flavors result, providing the cottage cheese with enhanced buttery, milky, and 'mozzarella cheese'-like flavors. The addition of the flavorant also decreases perception of sour notes from acid in the dressing.

It will be understood that a number of methods of manufacturing cream cheese may incorporate the step of extended heating of buttermilk and cream to form a flavorant that may then be incorporated into the method of manufacturing, and that modifications to the embodiments described herein may be made without departing from the spirit of the invention. For instance, the processes described herein could be used to enhance a variety of dairy and non-dairy products wherein sweet, buttery, dairy flavors are desirable. The disclosed flavorant is especially well suited for enhancing the flavor of low fat products, in order to make them comparable to full-fat products, but may also be used to impart intense flavors to full-fat products. The invention can also provide, for example, flavorants for other cultured products, process cheeses, puddings, ice creams, snack cracker fillings, and the like.

EXAMPLE 1

Flavorant Compounds

Heated and unheated mixtures containing buttermilk and/or cream were prepared and analyzed for the presence of flavor compounds. The following samples were prepared:
Control 1: 100% cream, unheated;
Control 2: 100% cream, heated for 8 hours at 190° F. (+/−5° F.);
Inventive Sample 3: 3% buttermilk powder and 97% cream, heated for 8 hours at 190° F. (+/−5° F.);
Inventive Sample 4: 6% buttermilk powder and 94% cream, heated for 8 hours at 190° F. (+/−5° F.);
Inventive Sample 5: 3% buttermilk powder and 97% whole milk, heated for 8 hours at 190° F. (+/−5° F.);

Mixtures of cream and buttermilk heated for extended times were shown to provide more prominent sweet and buttery notes than cream alone heated under the same conditions, or than buttermilk mixed with whole milk and heated under the same conditions. Gas chromatography analysis has confirmed that levels of flavor compounds are enhanced more significantly in heated compositions containing buttermilk and cream heated at 190° F. for 8 hours than in compositions containing heated cream alone or heated cream combined with dehydrated cream compositions.

For instance, FIG. 1 shows that in a variety of dairy-based compositions heated for 8 hours at about 190° F., those containing buttermilk contained significantly higher levels of maltol (often described as having a "sweet" and "caramelized" flavor) and furfuryl alcohol (often described as having a "green" or "hay" flavor). The height of the bars along the y-axis in FIG. 1 demonstrates the relative intensity of maltol and furfuryl alcohol readings based on gas chromatography. While buttermilk in a whole milk base provides similar levels of maltol, and to a lesser extent furfuryl alcohol, compared to a buttermilk and cream combination, cream alone does not provide the same intensity, even when heated at 190° F. for 8 hours.

The use of a combination of buttermilk and cream heated for an extended time also appears to provide unique flavor benefits by significantly increasing levels of furanol, which is known to have sweet and caramelized flavor. As seen in FIG. 2, gas chromatography reveals that the compositions on the right-hand side of the figure contain buttermilk and display significantly increased levels of furanol/maltol (measured as parts-per-million) as compared to compositions including only cream. However, compositions containing a mixture of buttermilk and cream also show increased levels of furanol over equivalent amounts of buttermilk in a lower fat base (whole milk).

Referring to FIG. 3, relative levels of methanol are shown by gas chromatography to be higher in heated compositions containing a mixture of buttermilk and cream when compared to those containing buttermilk and a lower fat dairy base (such as whole milk, shown at right in FIG. 3) or cream without buttermilk (shown at left in FIG. 3).

The heating of cream at 190° F. for 8 hours also contributes to increased levels of lactones, as shown in FIG. 4. Samples containing cream with or without buttermilk and heated for extended times shows significantly higher levels (measured in parts-per-billion) than unheated cream and buttermilk in a whole milk base heated under similar conditions.

Based on this testing, the combination of buttermilk and cream appears to be responsible for elevated levels of certain key flavor compounds when heated for extended times. Substituting other compounds does not achieve the same result, and while still showing much higher levels of one or more significant flavor compounds compared to unheated cream, failed to raise levels of one or more flavor compounds to the same level as shown in buttermilk/cream combinations that had been heated at 190° F. for about 8 hours.

EXAMPLE 2

Wheyless Cream Cheese

Buttermilk powder (4.3 lbs., O-At-Ka) and 56 lbs. cream were heated in a conical vessel for 8 hours at 190° F. (+/−5° F.). A portion of the heated buttermilk/cream mixture (13.2 lbs.) was added to 21.6 lbs water in a high-shear mixer (Breddo, Kansas City, Mo.). Powdered whey concentrate (WPC 53; 10.6 lbs) was then added to the mixer, and the contents were agitated until the powdered whey concentrate was well dispersed. At that point, fresh cream (75.5 lbs.) was added to the mixer, and the mixture therein was heated to 120° F. The mixture was then fed through lab-scale processing system including two heaters, a bank of hold tubes, a cooling section, and a viscous product outlet (Microthermics™, Raleigh, N.C.). The processing system was set at a preheat temperature of 140° F. The heat exchanger unit was a The mixture was then homogenized under pressure at two stages, first at 5,000 psi and then at 500 psi. The homogenized mixture was then pasteurized at 140° F. for 22 seconds. Additional flavorants were later added. The resulting cream cheese contained about 26% fat and had a creamy flavor similar to 30% fat cream cheese made without heated buttermilk.

EXAMPLE 3

Separator Process Cream Cheese

Buttermilk (1.5 lbs., Land-O-Lakes) and 48.5 lbs. cream were heated in a conical vessel for 8 hours at 190° F. (+/−5° F.). The heated cream mixture was added to fresh cream at the ratio of 1:6 heated cream mixture to fresh cream. The entire cream amount was then fed into a balance tank and milk was added until the milk and cream reached desired combined fat and protein levels (25.4% fat), at which point the mixture represented approximately 72% milk, 24% cream, and 4% buttermilk/cream flavorant. The mixture was then pasteurized at 190° F. for 19 seconds. Upon pasteurization, the mixture was then transferred to a culture tank where culture starter was added. After 14 hours the mixture was separated into curd and whey, with curd placed in a mixer along with whey protein concentrate, gums, salt and preservative. After separation, the finished cheese comprised about 6.7% of the novel flavorant, so that approximately 0.2% of the finished product comprised buttermilk. The resulting cream cheese contained about 25.6% fat and had a creamy flavor similar to 30% fat cream cheese made by the same separator process but without incorporation of the heated buttermilk and cream flavorant.

EXAMPLE 4

Cottage Cheese

Traditional Cottage Cheese was made with a skim cheese curd that was cooked, cut, and sized as a fresh curd in a dressing. To the dressing of the prepared cottage cheese was added about 2% by weight of a flavorant comprising 3% buttermilk and 97% cream, which was prepared by heating the buttermilk and cream mixture for 8 hours at 190° F. (+/−5° F.). Addition of the flavorant increased the perception of dairy flavors, including buttery, milky dairy, and 'mozzarella cheese'-like flavors, and reduced perception of sour flavors from acid in the dressing. Overall improved dairy richness was perceived.

What is claimed is:

1. A method for producing a cream cheese product comprising:
heating cream and buttermilk for at least about 4 hours at a temperature of about 150° F. to about 250° F. to form a heated buttermilk and cream mixture;
combining the heated buttermilk and cream mixture with a whey protein source and cream to form a cream cheese mix;
heating the cream cheese mix to a temperature of about 180° F. to about 195° F. for about 4 minutes to about 15 minutes; and
adjusting, if necessary, the pH of the cream cheese mix to a pH of about 4.4 to about 4.8 to provide a cream cheese;
wherein the heated buttermilk and cream mixture is about 10% to about 12% of the cream cheese mix.

2. A method for producing a cream cheese product comprising:
heating a mixture comprising cream and condensed or powdered sweet cream buttermilk in a ratio of 90:10 to 99:1 for at least about 4 hours at a temperature of about 150° F. to about 250° F. to form a heated buttermilk and cream mixture;
combining the heated buttermilk and cream mixture with a whey protein source and cream to form a cream cheese mix;
heating the cream cheese mix to a temperature of about 180° F. to about 195° F. for about 4 minutes to about 15 minutes; and
adjusting, if necessary, the pH of the cream cheese mix to a pH of about 4.4 to about 4.8 to provide a cream cheese;
wherein the heated buttermilk and cream mixture is about 10% to about 12% of the cream cheese mix.

3. The method of claim 1, wherein the cream and buttermilk are heated for about 8 hours to about 12 hours at a temperature of about 185° F. to about 195° F. to form the heated buttermilk and cream mixture.

4. The method of claim 3, wherein the whey protein source is whey protein concentrate.

5. The method of claim 4, wherein the whey protein concentrate is WPC 34, 53, or 80.

6. The method of claim 1, wherein the cream cheese mix is homogenized prior to the step of adjusting the pH of the cream cheese mix.

7. The method of claim 1, wherein, after adjusting the pH, the cream cheese mix is pasteurized at a temperature of about 185° F. to about 195° F. for about 20 to about 25 seconds.

\* \* \* \* \*